United States Patent [19]

Morris

[11] 4,000,995
[45] Jan. 4, 1977

[54] PARTICULATE BED DUST COLLECTORS

[75] Inventor: John M. Morris, Louisville, Ky.

[73] Assignee: Rexnord Inc., Milwaukee, Mich.

[22] Filed: May 19, 1975

[21] Appl. No.: 578,518

Related U.S. Application Data

[63] Continuation of Ser. No. 521,765, Nov. 7, 1974, abandoned, which is a continuation of Ser. No. 366,140, June 1, 1973, abandoned.

[52] U.S. Cl. .................... 55/282; 55/319; 55/324; 55/343; 55/350; 55/431; 55/432; 55/439; 55/459 R; 55/466; 55/512

[51] Int. Cl.² .......................... B01D 41/02

[58] Field of Search .......... 55/293, 294, 302, 343, 55/337, 350, 512, 432, 315, 319, 474, 494, 98, 282, 324, 338, 428, 431, 439, 459 R, 466

[56] References Cited

UNITED STATES PATENTS

| | | | |
|---|---|---|---|
| 1,508,331 | 9/1924 | Huber | 55/13 X |
| 1,944,268 | 1/1934 | Rathbun | 55/341 X |
| 2,633,206 | 3/1953 | Bruckner | 55/293 X |
| 3,146,080 | 8/1964 | Ruble et al. | 55/315 X |
| 3,228,755 | 1/1966 | Lottinville | 55/131 X |
| 3,473,300 | 10/1969 | Wilm et al. | 55/315 X |
| 3,564,570 | 2/1971 | Lincoln et al. | 55/302 X |
| 3,594,991 | 7/1971 | Berz et al. | 55/294 |
| 3,633,337 | 1/1972 | Walker et al. | 55/131 X |
| 3,646,595 | 2/1972 | Williams | 55/302 X |
| 3,798,882 | 3/1974 | Kalen | 55/302 |
| 3,861,893 | 1/1975 | Smith et al. | 55/302 |

Primary Examiner—Frank W. Lutter
Assistant Examiner—Kathleen J. Prunner
Attorney, Agent, or Firm—Marshall & Yeasting

[57] ABSTRACT

The dust collecting efficiency of a gravel bed filter system in which a plurality of filter modules receive dirty gas from and dischage backflush gas and collected dust into a plenum chamber is enhanced by continuously drawing gas from a downstream end of the plenum chamber, passing the withdrawn gas through a cyclone separator, and returning the gas to the upstream end of the plenum chamber.

4 Claims, 5 Drawing Figures

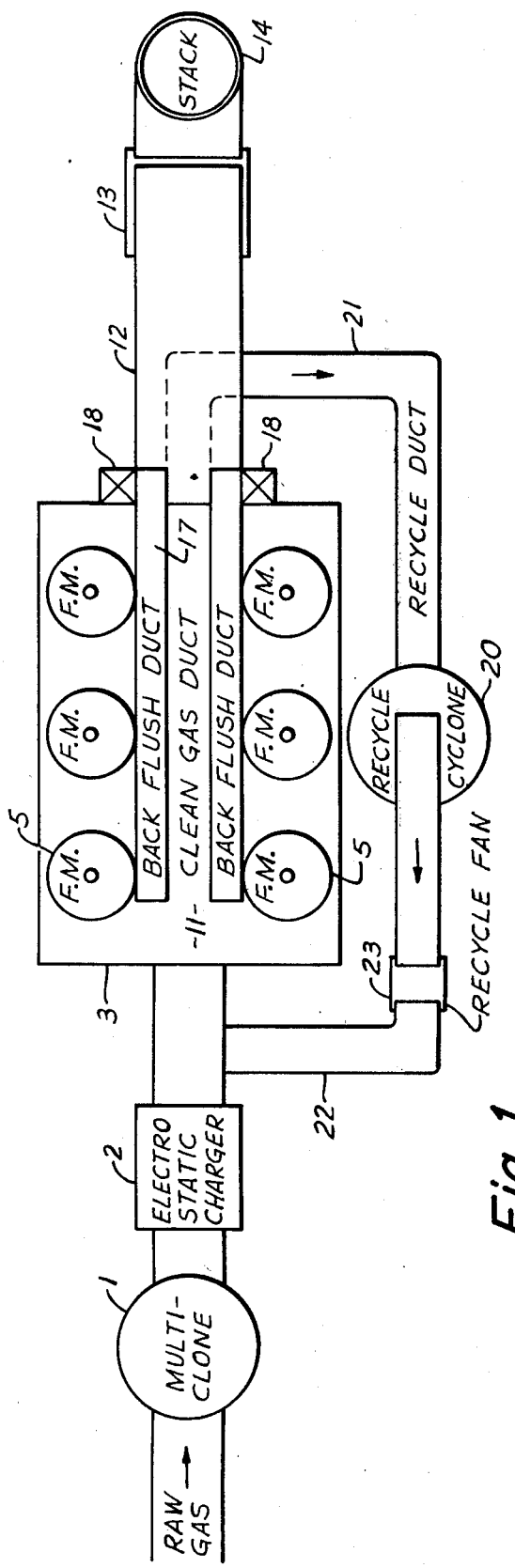
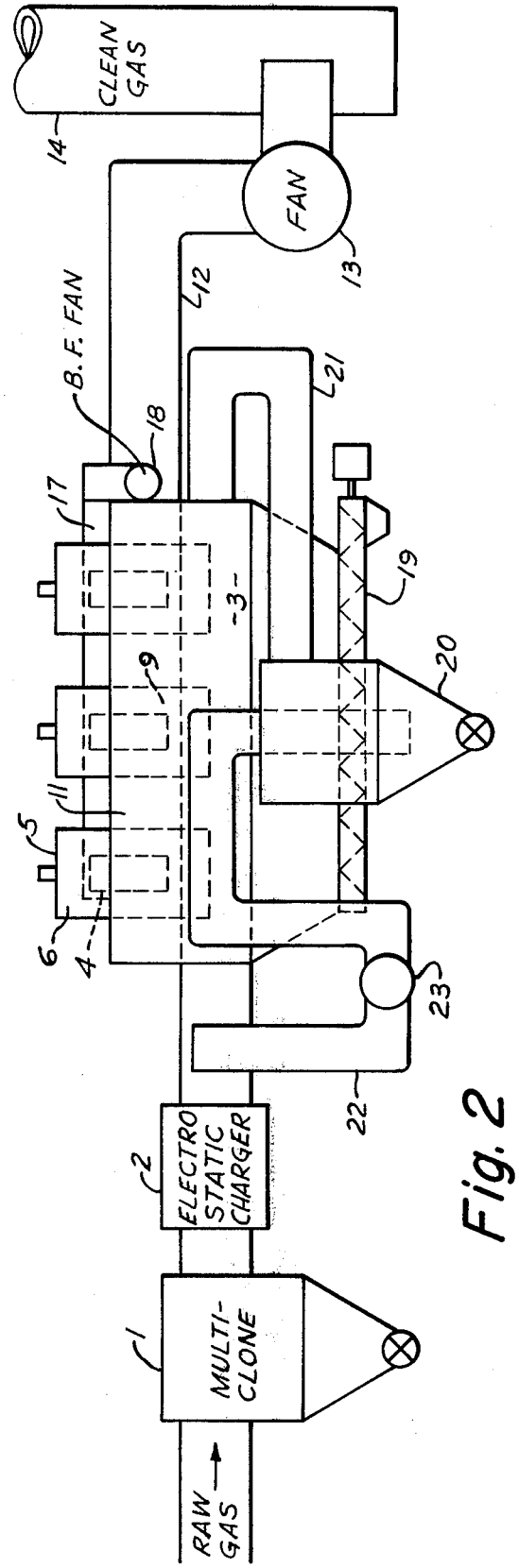

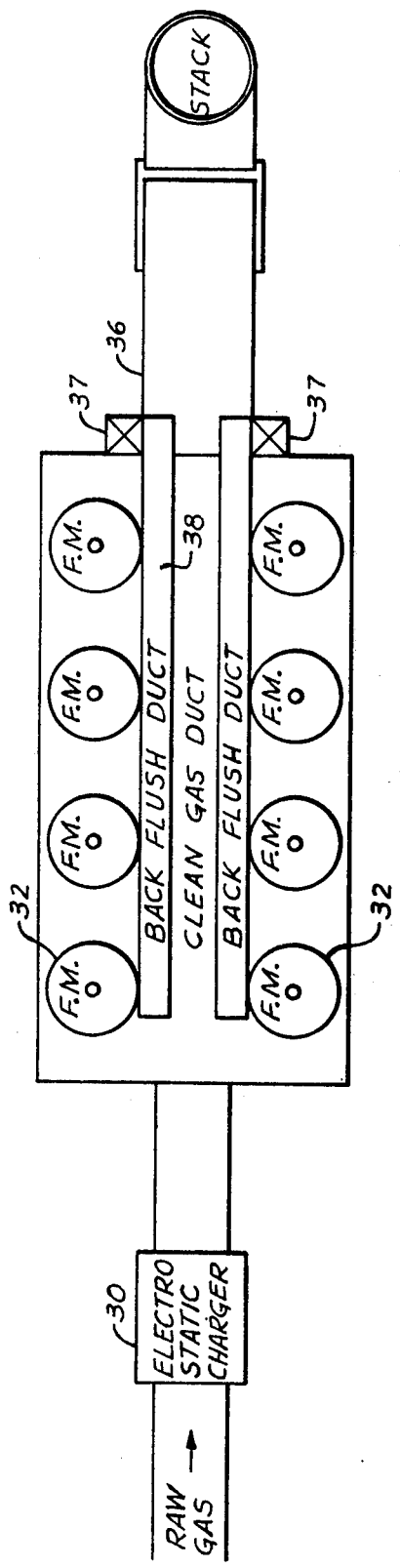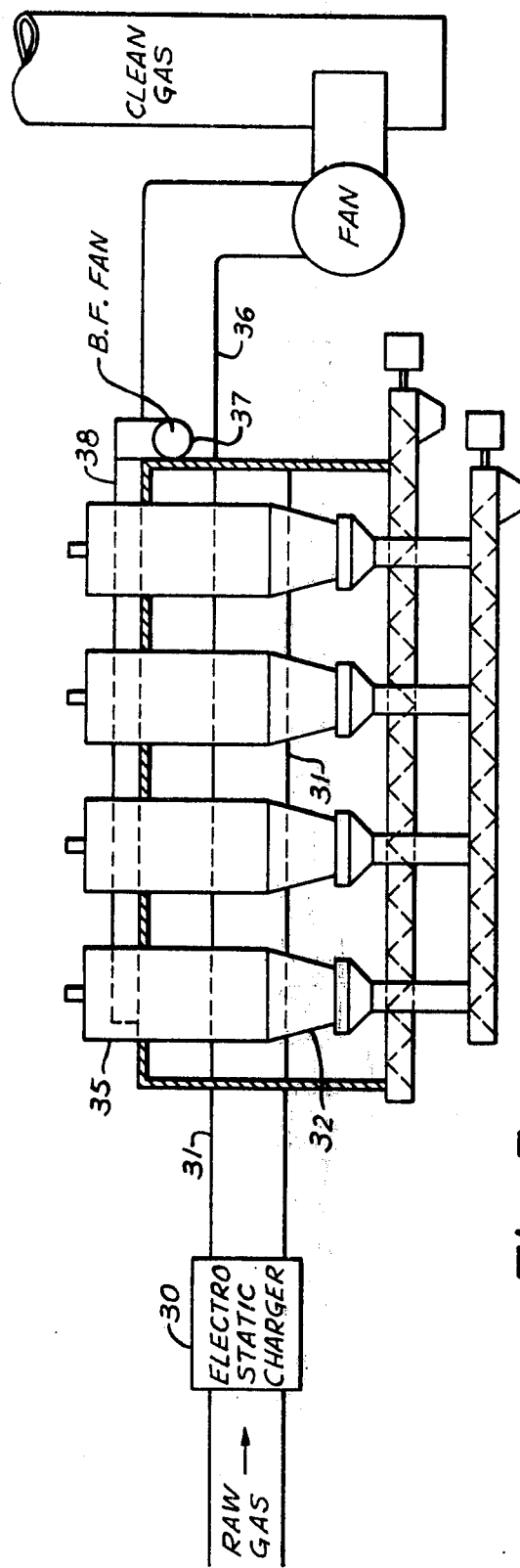
Fig. 4
Fig. 5

PARTICULATE BED DUST COLLECTORS

This is a continuation of application Ser. No. 521,765 filed Nov. 7, 1974, which was a continuation of application Ser. No. 366,140, filed June 1, 1973, both of which are now abandoned.

BACKGROUND OF THE INVENTION

Dust collectors are desirable and in many cases necessary to remove dust or smoke from the air before discharging the air to the atmosphere. The dust may contain valuable materials to be reclaimed or it may constitute a nuisance if discharged to the atmosphere. Dust collectors in use include various forms of collectors, including cyclones as a form of inertia separator. Other collectors use a filtering process with periodic cleaning of the filter. For high temperature gases, a gravel bed filter (using a loose particulate bed of material) is commonly used and is regenerated by passing clean gas through the bed in a reverse direction at a velocity to separate the accumulated dust from the bed material.

SUMMARY OF THE INVENTION

According to the invention the raw gas (gas carrying dust or smoke) is ionized by either a high voltage corona discharge or a radio active material in an amount to cause the dust to agglomerate on the particles of a particulate bed of material instead of merely being trapped between the particles of the bed.

Further, according to the invention, the raw gas in a plenum chamber feeding the particulate bed filters is kept in motion to equalize the load on the filter beds by withdrawing gas from the chamber at a point remote from the inlet, passing the withdrawn gas through a recycle cyclone separator and then feeding the gas from the cyclone into the inlet of the plenum chamber.

BRIEF DESCRIPTION OF THE DRAWINGS

In the drawings:

FIG. 1 is a plan view of a dust collector system according to the invention.

FIG. 2 is a side elevation of the dust collector system of FIG. 1.

FIG. 4 is a plan view of another dust collector system constructed according to the invention.

FIG. 5 is a side elevation of the system shown in FIG. 4.

SPECIFIC DESCRIPTION OF PREFERRED EMBODIMENT

Figure 3:
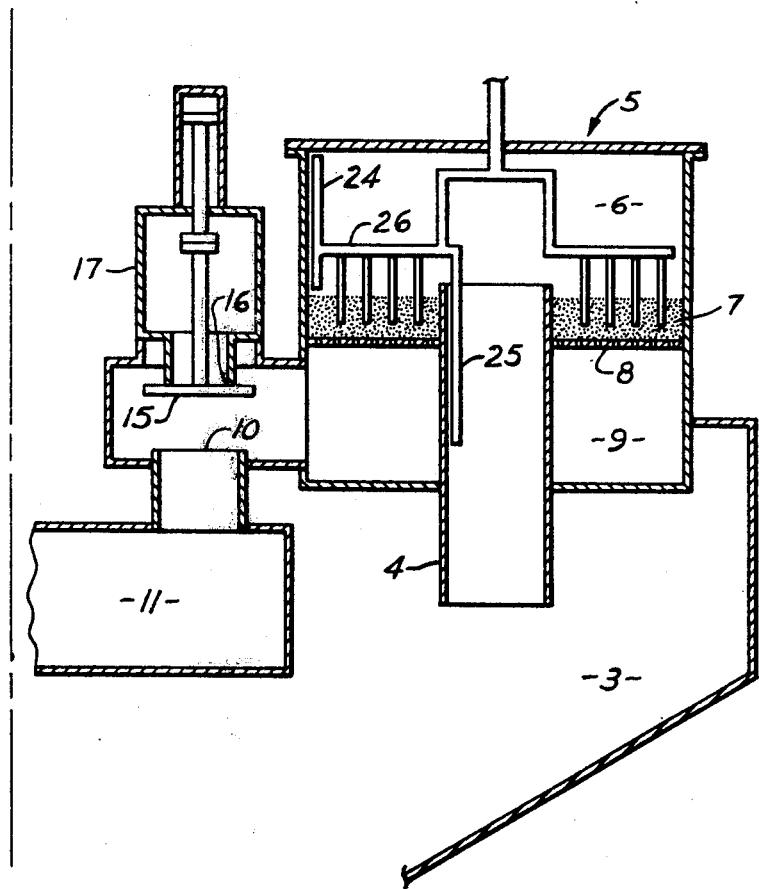
FIG. 3 is a vertical section through one of the filter modules employed in the system.

In a dust collector according to the invention as shown in FIG. 1, raw or dusty air or gas is first drawn through a multicyclone to separate the large or heavy dust particles from the gas. The multicyclone may be of type described in Chapter 23 of Fan Engineering of the Buffalo Forge Co. under the heading "Dry Inertial Collectors". Briefly, a multicyclone comprises a plurality of parallelly arranged vertical cylinders each terminating in a truncated conical section at its lower end. These are fed from a first plenum chamber overlying the upper ends of the cylinder. Each cylinder has a smaller outlet tube extending upwardly along the axis of the cylinder from its lower end upwardly through the plenum chamber to a second or outlet plenum chamber superposed in the first or inlet chamber. The gas and suspended dust enters the inlet plenum chamber, flows downwardly in the annular spaces between the cylinder and outlet tubes, and up the outlet tubes to the outlet chamber. Guide vanes in the annular spaces force the gas to follow a helical path as it flows downwardly. The dust is collected in a dust chamber enclosing the lower ends of the vertical cylinder including the conical sections.

From the multicyclone 1 the dust laden gas flows through an electrostatic charger 2 that is operated at a voltage sufficient to ionize the gas and charge the dust particles with a small charge. The charger is of conventional design. From the charger the gas and charged dust flows into an inlet gas plenum chamber 3 and then up a central tube 4 of a filter module 5 (FIG. 3). The gas flow up the tube 4 enters an upper chamber 6 of the module 5, and then down through a gravel bed 7 and a perforated plate 8 supporting the gravel bed 7.

From the perforated plate 8 the gas flows through a lower chamber 9 through a valve orifice 10 into a clean air duct 11. The duct 11 leads to an outlet pipe 12 connected to an induction fan 13 that discharges the cleaned gas to a stack or collector 14.

Some of the charged dust particles that are carried into the plenum chamber 3 may lodge on the walls of the chamber 3. Most of the dust travels up the tube 4 and into the gravel bed 7. As it hits the gravel its charge is transferred to the gravel and thence to ground and in the process the dust particles stick to the particles of gravel. The next particles discharge through those already on the surface and are thus agglomerated into larger chunks or clusters on the gravel bed.

The collected dust in the filter bed 7 clogs the filter and must be removed. This is done by shifting a valve disk 15 to close the orifice 10 and open a facing orifice 16 leading to a back flush air supply duct 17.

The backflush duct 17 is supplied with clean air pressure from a fan 18 that draws air from the clean air pipe 12. When the valve disk 15 is moved down, the air from the duct 12 is fed through valve 16 into the chamber 9 and up through the bed 7. The air flow dislodges the collected agglomerated dust and carries it down the tube 4 and into the chamber 3. The agglomerated material either falls to the bottom of the chamber and is removed by a screw conveyor 19 or is caught in a recirculating system including a cyclone 20 that receives gas and agglomerated material through a pipe 21 connected to the downstream end of the plenum chamber 3. The discharge of the cyclone 20 is through a pipe 22 including a fan 23 and back into the plenum chamber 3.

Thus the dust collected in the filter bed is agglomerated by the electrostatic action and recovered during backflush either by the screw conveyor 19 in the chamber 3 or from the bottom of the cyclone 20.

The use of the electrostatic charge to aid the agglomeration of dust on the surface of the filter bed has the advantage that some of the dust adheres to the side walls of the chamber 3, the tube 4 and walls of the chamber 6. This dust is dislodged during backflush by scrapers 24, 25 attached to a rake 26 that is rotated during backflush to agitate and level the filter bed. The scraper 24 cleans the side walls of the chamber 6 while the scraper 25 cleans the sides of the tube 4.

A particular advantage of the recirculating system including the cyclone 20 is that the concentration of dust entering through the pipes 4 as the respective filters are backflushed is collected in the cyclone rather than merely moving to and being caught in another filter bed.

In this system one or two cyclones, one acting on the incoming dirty gas and one to catch agglomerated material during backflush serve a number of individual filter beds.

In another form of the invention, as shown in FIGS. 4 and 5, a cyclone is used immediately ahead of each filter bed and an electrostatic charger is placed in the air stream ahead of a manifold feeding the cyclones. In this arrangement the raw gas is fed through an electrostatic charger 30 and thence to a manifold 31 feeding a plurality of cyclones 32. Each of the cyclones 32 is mounted directly below a filter bed chamber 35, each filter bed chamber is similar to the chamber 5 (FIG. 3). When used with individual cyclones the tubes or pipes 4 serve as axial outlets for the cyclones 32 and the conical portion of the cyclone serves as a collection chamber for dust both during normal operation and during backflush.

During normal operation the gas, after being charged in the charger 30, passes through the manifold 31 and tangentially into the cyclone 32. From the cyclone the gas, now stripped of large dust particles, moves through the filters and into the outlet duct 36 corresponding to the duct 11 shown in FIG. 3.

During backflush of one of the filter beds its valve 15 closes the connection to the outlet duct 36 and at the same time admits clean gas that is supplied by a backflush fan 37, fed from the duct 36, and connected to force air into flush duct 38, corresponding to duct 17. The air flows up through the filter bed, and down into the cyclone 32. From the cyclone 32 the gas flows into the manifold 31 and then to the other cyclones.

The collected dust is removed through the bottoms of the cyclones in any convenient manner.

The addition of the electrostatic charger in this system increases the efficiency by promoting the agglomeration process so that the dust is more readily separated in the cyclones during the backflush operation.

These specific figures and the accompanying description are intended merely to illustrate the invention and not to impose limitations on the scope of the claims.

I claim:

1. In a dust collecting system, in combination, a plenum chamber, a dirty gas inlet at one end of said plenum chamber, a solids removal means at the bottom of the plenum chamber, a plurality of filter modules each comprising a container having an upper and a lower chamber, a perforated plate in each module separating the upper and lower chamber, a bed of particulate filter material supported on each perforated plate, separate conduits one for each module connecting its upper chamber to said plenum chamber, a clean gas duct, a backflush gas duct, valve means individual to each module adapted to selectively connect the lower chamber of each module to the clean gas duct and the backflush gas duct, means maintaining the pressure in the clean gas duct less than the pressure in the plenum chamber, means maintaining the pressure in the backflush duct greater than the pressure in the plenum chamber, and a recirculating system comprising a cyclone collector and a fan connected in series between an end of the plenum chamber remote from said dirty gas inlet and the inlet end of the chamber, whereby agglomerated dust backflushed from a filter bed into the plenum chamber and failing to settle to the solids removal means is carried by the recirculating system and separated in the cyclone thereof.

2. In a dust collecting system according to claim 1, said recirculating system including a duct extending from said end of the plenum chamber remote from the dirty gas inlet to the inlet of the cyclone, said duct being connected to the plenum chamber at a level below the lower ends of the conduits from the plenum chamber to the upper chambers of the modules.

3. In a dust collecting system, in combination, a plenum chamber, a dirty gas inlet at one end of said plenum chamber, a solids removal means at the bottom of the chamber, a plurality of filter bed modules connected to the plenum chamber to receive dirty gas from the chamber and to discharge backflush gas and collected dust to the chamber, and auxiliary means for extracting dust from the plenum chamber comprising a cyclone having its tangential inlet connected to the plenum chamber at a location remote from the dirty gas inlet and having its discharge connected through a fan to the dirty gas inlet to the plenum chamber.

4. In a dust collector system, in combination, a plenum chamber including a dirty gas inlet at one end, a filter bed of particulate material, means for passing a dirty gas from the plenum chamber through the bed in a first direction to collect dust particles in the bed, means for forcing clean air through the filter bed in a reverse direction to dislodge the collected dust and return it to the plenum chamber, means for collecting the dislodged dust returned to the plenum chamber, and recirculating means including a cyclone for recirculating gas from an end of said plenum chamber remote from said inlet end, extracting dust therefrom and returning the gas to said inlet end.

* * * * *

UNITED STATES PATENT AND TRADEMARK OFFICE
CERTIFICATE OF CORRECTION

PATENT NO. : 4,000,995
DATED : January 4, 1977
INVENTOR(S) : John M. Morris

It is certified that error appears in the above—identified patent and that said Letters Patent are hereby corrected as shown below:

In the drawings, Sheet 1, Figure 1 and Figure 2, the word "MULTICLONE", reference numeral 1, should read ---MULTICYCLONE---.

Signed and Sealed this second Day of August 1977

[SEAL]

Attest:

RUTH C. MASON
Attesting Officer

C. MARSHALL DANN
Commissioner of Patents and Trademarks